United States Patent
Lin

(10) Patent No.: US 8,428,643 B2
(45) Date of Patent: Apr. 23, 2013

(54) SIGN LANGUAGE RECOGNITION SYSTEM AND METHOD

(75) Inventor: Yung-Chuan Oneal Lin, Tu-Cheng (TW)

(73) Assignee: Chi Mei Communication Systems, Inc., New Taipei (TW)

( * ) Notice: Subject to any disclaimer, the term of this patent is extended or adjusted under 35 U.S.C. 154(b) by 350 days.

(21) Appl. No.: 12/752,154

(22) Filed: Apr. 1, 2010

(65) Prior Publication Data

US 2011/0151846 A1 Jun. 23, 2011

(30) Foreign Application Priority Data

Dec. 17, 2009 (CN) .......................... 2009 1 0311739

(51) Int. Cl.
*H04M 1/00* (2006.01)
*H04M 11/04* (2006.01)
*G10L 15/26* (2006.01)
*G10L 13/00* (2006.01)

(52) U.S. Cl.
USPC .... 455/550.1; 455/556.1; 379/52; 379/93.15; 704/235; 704/260; 704/271; 704/3; 704/2

(58) Field of Classification Search ............... 455/556.1, 455/550.1; 379/52, 93.15; 704/235, 260, 704/271, 3, 2
See application file for complete search history.

(56) References Cited

U.S. PATENT DOCUMENTS

| 5,982,853 A * | 11/1999 | Liebermann .................... 379/52 |
| 6,377,925 B1 * | 4/2002 | Greene et al. ................. 704/271 |
| 6,549,887 B1 * | 4/2003 | Ando et al. .................... 704/271 |
| 2002/0152255 A1 * | 10/2002 | Smith et al. ................... 709/102 |
| 2002/0161582 A1 * | 10/2002 | Basson et al. ................. 704/260 |
| 2003/0191779 A1 * | 10/2003 | Sagawa et al. ............. 707/104.1 |
| 2004/0012643 A1 * | 1/2004 | August et al. ................. 345/865 |
| 2006/0087510 A1 * | 4/2006 | Adamo-Villani et al. .... 345/474 |
| 2009/0313013 A1 * | 12/2009 | Wen .............................. 704/235 |
| 2010/0107192 A1 * | 4/2010 | Sennett et al. .................. 725/33 |
| 2010/0291968 A1 * | 11/2010 | Ander et al. ............... 455/556.1 |
| 2010/0316978 A1 * | 12/2010 | Goode ......................... 434/112 |
| 2011/0109971 A1 * | 5/2011 | Beach et al. .................. 359/618 |
| 2011/0202862 A1 * | 8/2011 | Kramer et al. ................ 715/771 |
| 2011/0295829 A1 * | 12/2011 | Boncyk et al. ................ 707/706 |

* cited by examiner

*Primary Examiner* — Bobbak Safaipour
(74) *Attorney, Agent, or Firm* — Altis Law Group, Inc.

(57) ABSTRACT

A sign language recognition system includes a menu generating module, an image processing module, and text processing module. The image processing module controls an image capturing unit to capture a gesture image of a target person when an image recognition icon is selected, extracts sign language data from the gesture image, and transmits the sign data packet to a server for analyzing the sign language data to generate sign recognition information. The text processing module packs text data to be sent to a reception device, and a reception language and a phone number of the reception device to generate a text data packet when a text recognition icon is selected, and sends the text data packet to the server for analyzing the text data to generate a sign recognition image recognizable by the reception device.

16 Claims, 4 Drawing Sheets

SIGN LANGUAGE RECOGNITION SYSTEM AND METHOD

BACKGROUND

1. Technical Field

Embodiments of the present disclosure relate generally to sign recognition in electronic equipment, and more particularly to a sign language recognition system and method.

2. Description of Related Art

In today's wireless world, communication is carried out using devices such as mobile phones, desktops, laptops and handhelds, to convey information. While communication technology has developed to a high level, little attention has been paid to body language that can be used to communicate information between individuals or groups.

Around the world, gestures play an integral part of communication within every culture, and can be interpreted as words and phrases thus constituting a sign language. However, it is inconvenient and difficult to communicate information between individuals or groups using communication devices.

Accordingly, there is a need for a sign language recognition system and method implemented by a mobile communication device, to recognize sign language.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
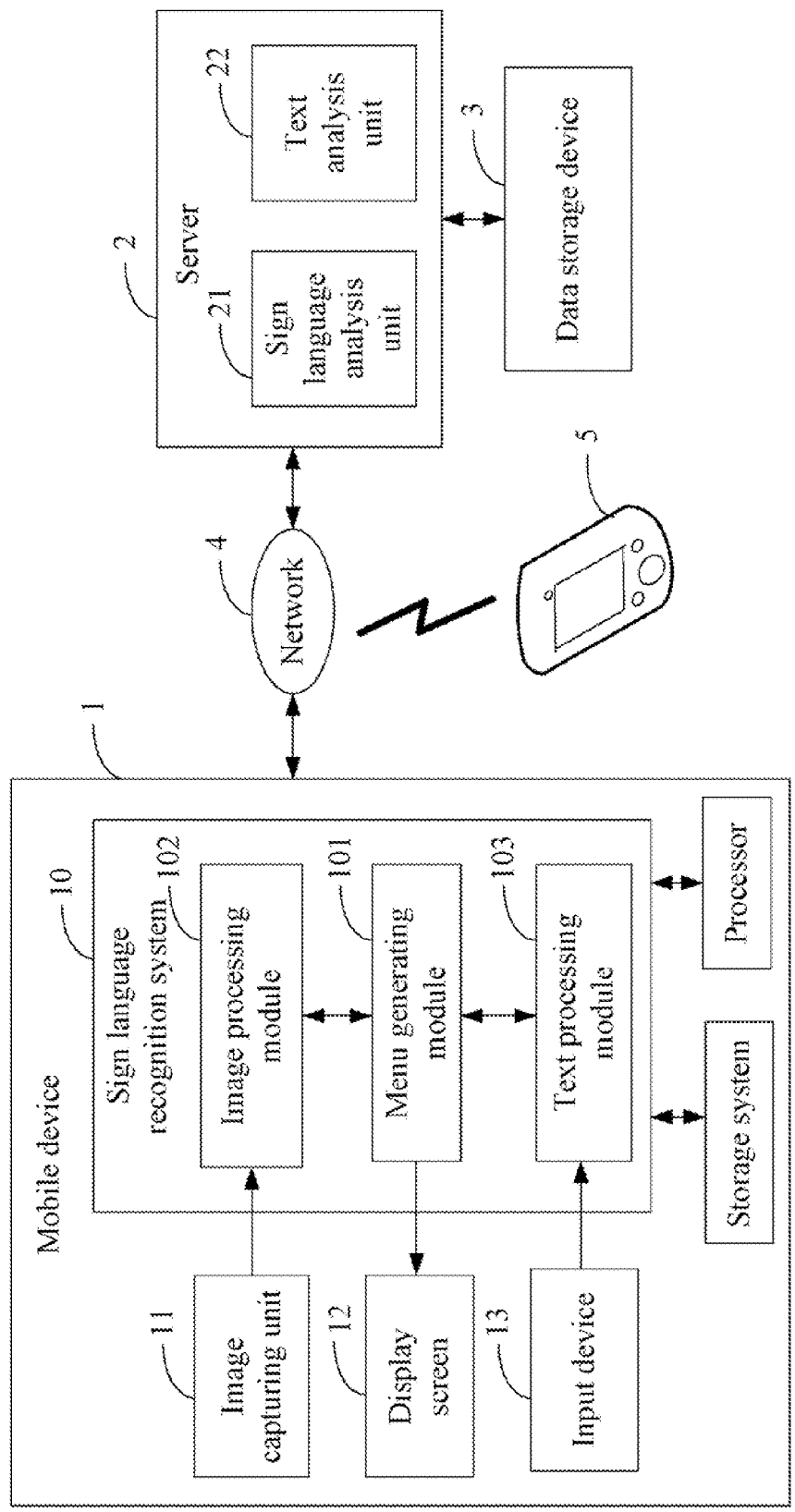
FIG. 1 is a schematic diagram of one embodiment of a sign language recognition system implemented by a mobile device.

FIG. 1 is a schematic diagram of one embodiment of a sign language recognition system 10. In one embodiment, the sign language recognition system 10 is installed and implemented by a mobile device 1 connected to a server 2 through a network 4. The mobile device 1 can also communicate with a reception device 5 through the network 4. Either the mobile device 1 or the reception device 5 may be a mobile phone, a desktop, a laptop, a handheld, or any other suitable communication device for transferring data. The network 4 may be an Internet, an intranet, or a wireless communication network, such as a global system for mobile communications (GSM) network, or a general packet radio service (GPRS) network, for example.

The server 2 connects to a data storage device 3 that stores a sign language standard and a text analysis standard. In one embodiment, the sign language standard may be a common sign language standard or a deaf sign language standard. The common sign language standard includes a plurality of common signs that are familiar to a common person, and each of the common signs corresponds to a group of numbers "0-9". For example, "110" represents a public security alarm, and "119" represents a fire alarm. The deaf sign language standard includes a plurality of deaf signs that are familiar to a deaf person, and each of the deaf signs may also correspond to a group of numbers "0-9". In other embodiments, the sign language standard can be body language according to user's requirements. For example, a "120 emergency alarm" can be defined as clasping his/her head with hands, and a "119 fire alarm" can be defined as a person bending his/her waist.

The mobile device 1 may include an image capturing unit 11, a display screen 12, an input device 13, a storage system 14, and at least one processor 15. The image capturing unit 11 is operable to capture a sign image of a target person when the user wants to communicate with the target person using sign language. The target person may be a deaf person who can talk using deaf sign language. In one embodiment, the sign language recognition system 10 is included in the storage device 31 or a computer readable medium of the mobile device 1. In another embodiment, the sign language recognition system 10 may be included in an operating system of the mobile communication device 3, such as the Unix, Linux, Windows 95, 98, NT, 2000, XP, Vista, Mac OS X, an embedded operating system, or any other compatible operating system. The storage system 14 may be an internal storage device, such as a random access memory (RAM) for temporary storage of information and/or a read only memory (ROM) for permanent storage of information. The storage system 14 may also be an external storage device, such as a hard disk, a storage card, or a data storage medium. The at least one processor 15 runs various software modules stored in the storage system 14 to perform sign language recognition functions for the mobile device 1.

In one embodiment, the sign language recognition system 10 may include a menu generating module 101, an image processing module 102, and a text processing module 103. One or more computerized codes of the function modules 101-103 may be stored in the storage system 14 and executed by the processor 15. In general, the word "module," as used herein, refers to logic embodied in hardware or firmware, or to a collection of software instructions, written in a programming language. The software instructions in the modules may be embedded in firmware, such as an EPROM. The modules described herein may be implemented as either software and/or hardware modules and may be stored in any type of computer-readable medium or other storage device.

Figure 2:
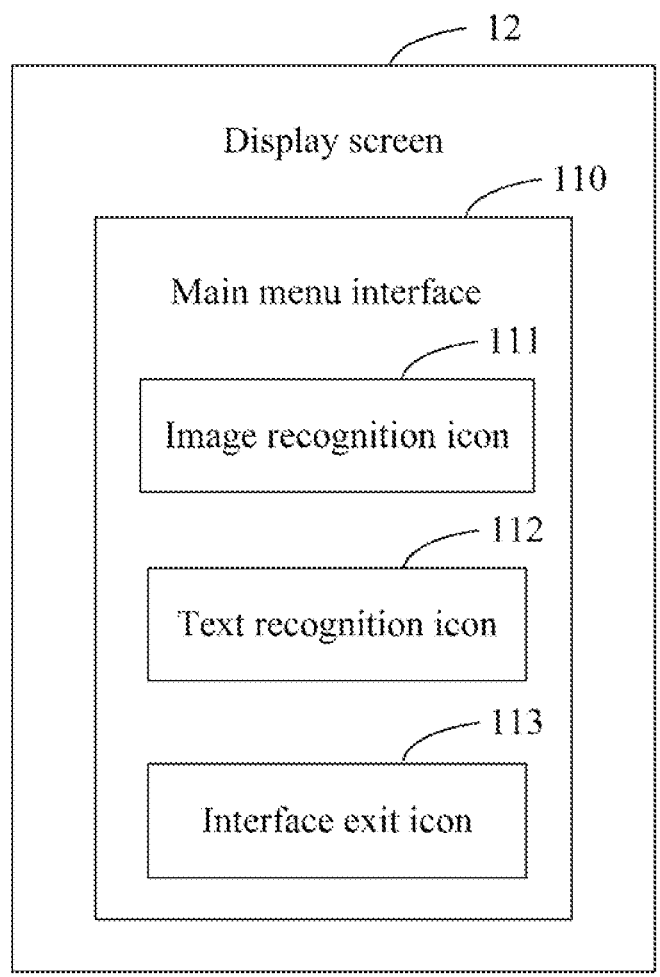
FIG. 2 is a schematic diagram of one embodiment of a main menu interface displayed on a display screen of the mobile device in FIG. 1.
Figure 3:
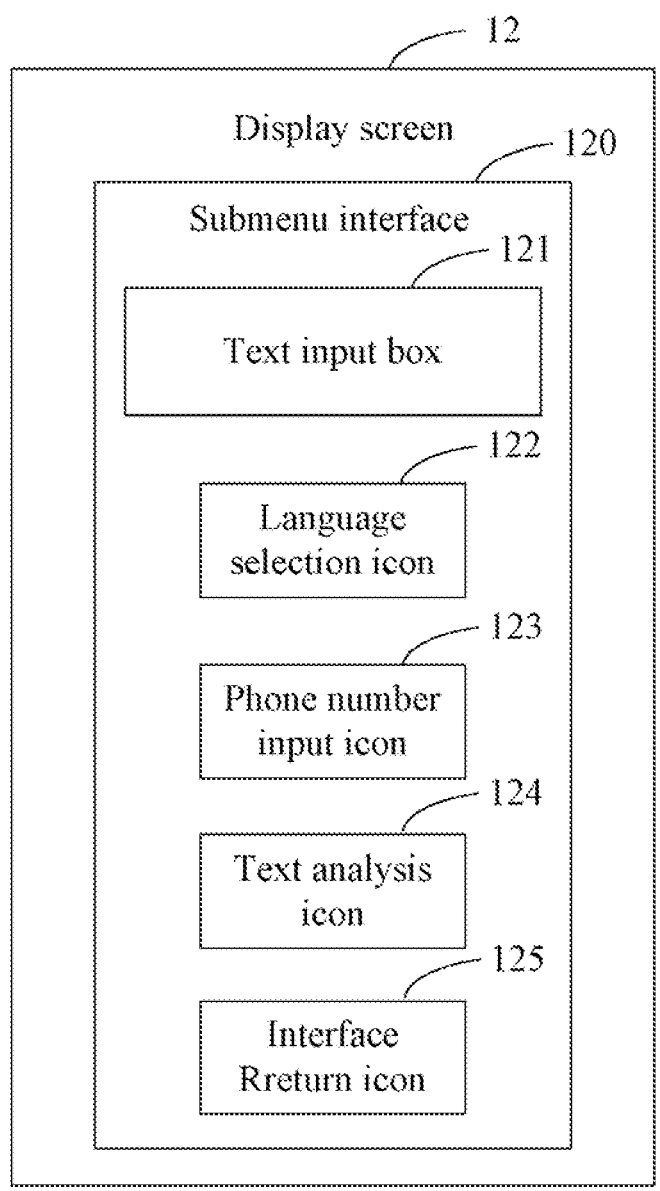
FIG. 3 is a schematic diagram of one embodiment of a submenu interface displayed on a display screen of the mobile device in FIG. 1.

The menu generating module 101 is operable to generate a main menu interface 110 and a submenu interface 120, and display the main menu interface 110 and the submenu interface 120 on the display screen 12. In one embodiment, either the main menu interface 110 or the submenu interface 120 is a graphical interface comprising a plurality of function icons for a user to perform a sign language recognition function of the mobile device 1. Referring to FIG. 2, the main menu interface 110 may include an image recognition icon 111, a text recognition icon 112, and an interface exit icon 113. Referring to FIG. 3, the submenu interface 120 may include a text input box 121, a language selection icon 122, a phone number input icon 123, a text analysis icon 124, and an interface return icon 125. Detailed descriptions of the main menu interface 110 and the submenu interface 120 are shown in FIG. 2 and FIG. 3 as described below.

The image processing module 102 is operable to control the image capturing unit 11 to capture a gesture image of the target person when the image recognition icon 111 is selected, and extract sign language data from the gesture image according to the body language of the target person, such as gestures, face, eyes, and mouth of the target person. The image processing module 102 is further operable to pack the sign language data and a preset language of the mobile device 1 to generate a sign data packet, and transmit the sign data packet to the server 2 through the network 4. The preset language is a common language used in the mobile device 1, for example, English, French, German, or Chinese.

The text processing module 103 is operable to pack text data, a reception language, and a reception phone number to generate a text data packet when the text recognition icon 124 of the submenu interface 120 is selected, and send the text data packet to the server 2 through the network 4. The text data is input from the text input box 121 and to be sent to the reception device 5. The language selection icon 122 selects the reception language, such as English used in the reception device 5, for example. For example, the phone number of the reception device 5 is input from the phone number input icon 123, such as 138xxxxxxx.

In one embodiment, the server 2 may include a sign language analysis unit 21 and a text analysis unit 22. The sign language analysis unit 21 is operable to receive the sign data packet transmitted from the mobile device 1, and analyze the sign data packet to generate a sign analysis result according to the sign language standard stored in the data storage device 3. The sign language analysis unit 21 is further operable to convert the sign analysis result into sign recognition information according to the preset language of the mobile device 1, and send the sign recognition information to the mobile device 1 through the network 4. When the mobile device 1 receives the sign recognition information from the server 2, the display screen 12 displays the sign recognition information in the format of the preset language of mobile device 1. Thereby, the user can understand the sign language of the target person by reading the sign recognition information displayed on the display screen 12 of the mobile device 1.

The text analysis unit 22 is operable to receive the text data packet transmitted from the mobile device 1, and analyze the text data packet to generate a text analysis result according to the text analysis standard stored in the data storage device 3. The text analysis unit 22 is further operable to convert the text analysis result into a sign recognition image according to the sign language standard stored in the data storage device 3, and transmit the sign recognition image to the reception device 5 through the network 4 according to the reception phone number. When the reception device 5 receives the sign recognition image from the server 2, a user of the reception device 5 may review the sign recognition image to understand the text data transmitted from the mobile device 1.

FIG. 2 is a schematic diagram of one embodiment of a main menu interface 110 displayed on the display screen 12. In the embodiment, the main menu interface 110 includes an image recognition icon 111, a text recognition icon 112, and an interface exit icon 113. If a user needs to communicate with the target person (e.g., a deaf person), the user can select the image recognition icon 111 to perform image recognition function of the mobile device 1. If the user needs to use a text recognition function of the mobile device 1 to communicate with the reception device 5, the user can select the text recognition icon 111 on the main menu interface 110 to perform the text recognition function. The submenu interface 120 is displayed on the display screen 12 when the user selects the text recognition icon 111 on the main menu interface 110. The mobile device 1 terminates the main menu interface 110 when the user selects the interface exit icon 113 on the main menu interface 110.

FIG. 3 is a schematic diagram of one embodiment of a submenu interface 120 displayed on the display screen 12. In the embodiment, the submenu interface 120 includes a text input box 121, a language selection icon 122, a phone number input icon 123, a text analysis icon 124, and an interface return icon 125. The text input box 121 is operable to receive text data sent to the reception device 5 from the input device 13. The language selection icon 122 is operable to select a reception language used in the reception device 5, such as English, French, German, or Chinese. The phone number input icon 123 is operable to receive a phone number of the reception device 5 from the input device 13, such as 138xxxxxxx, for example. The text analysis icon 124 is operable to send the text data, the reception language, and the phone number to the server 2 for text analysis. When the user selects the interface return icon 125 on the submenu interface 120, the mobile device 1 exits the submenu interface 110 to return to the main menu interface 110.

Figure 4:
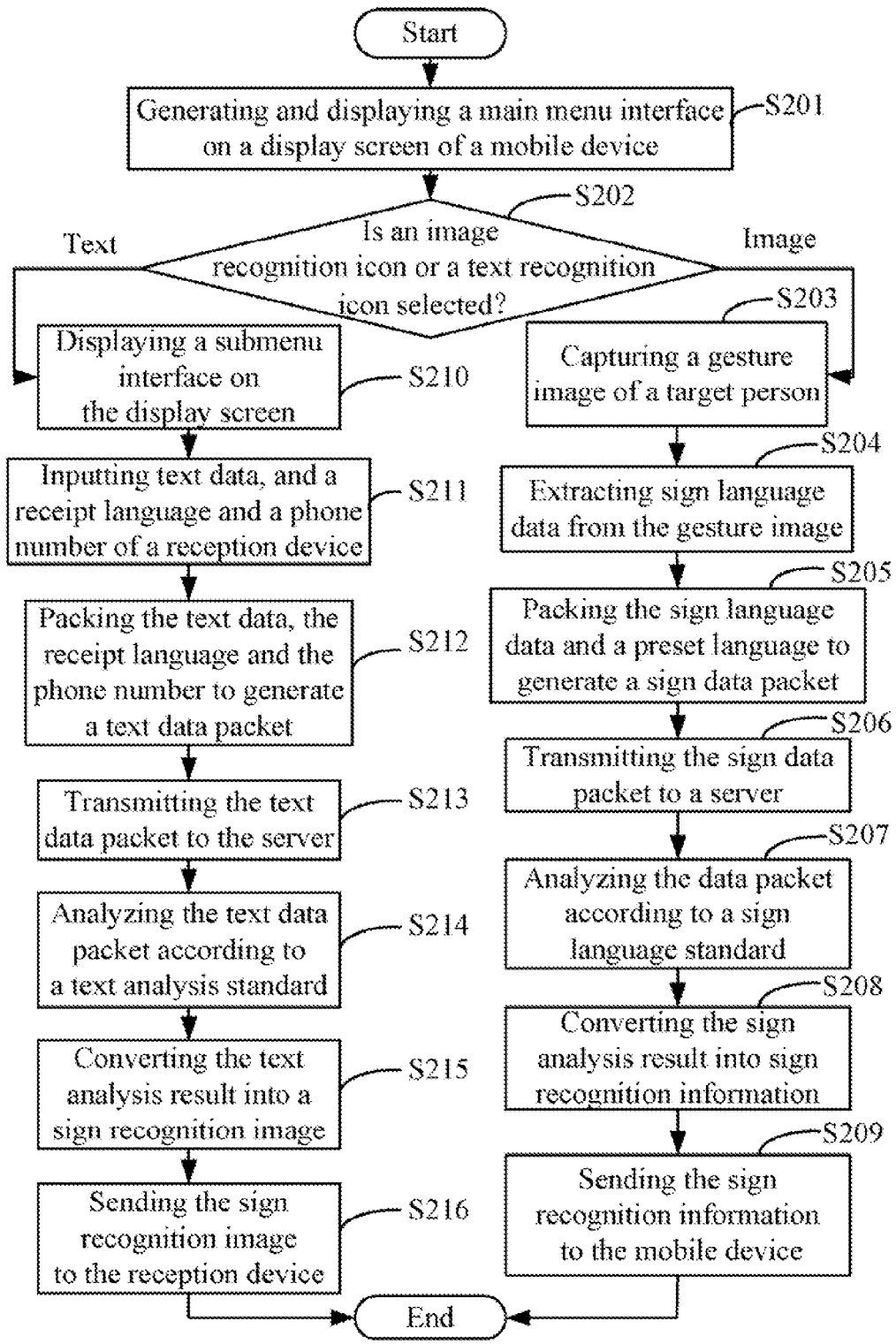
FIG. 4 is a flowchart of one embodiment of a method for recognizing sign language by the sign language recognition system as described in FIG. 1.

FIG. 4 is a flowchart of one embodiment of a method for recognizing sign language by the sign language recognition system 10 as described in FIG. 1. Depending on the embodiment, additional blocks may be added, others removed, and the ordering of the blocks may be changed.

In block S201, the menu generating module 101 generates and displays a main menu interface 110 on the display screen 12 when the mobile device 1 is started. As mentioned above in FIG. 2, the main menu interface 110 includes an image recognition icon 111, a text recognition icon 112, and an interface exit icon 113.

In block S202, the mobile device 1 determines whether the image recognition icon 111 or the text recognition icon 112 is selected. If the image recognition icon 111 is selected, block S203 is implemented. If the text recognition icon 112 is selected, block S210 is implemented.

In block S203, the image processing module 102 controls the image capturing unit 11 to capture a gesture image of a target person. In the embodiment, the target person may be a deaf person who can communicate with the user using deaf sign language. In block S204, the image processing module 102 extracts sign language data from the gesture image according to the body language of the target person, such as gestures, face, eyes, and mouth of the target person. In block S205, the image processing module 102 packs the sign language data and a preset language of the mobile device 1 to generate a sign data packet. In block S206, the image processing module 102 transmits the sign data packet to the server 2 through the network 4. The preset language is a user language used in the mobile device 1, for example, English, French, German, or Chinese.

In block S207, the sign language analysis unit 21 analyzes the sign data packet to generate a sign analysis result according to the sign language standard stored in the data storage device 3 when the server 2 receives the sign data packet from the mobile device 1. In block S208, the sign language analysis unit 21 converts the sign analysis result into sign recognition information according to the preset language of the mobile device 1. In block S208, the sign language analysis unit 21 sends the sign recognition information to the mobile device 1 through the network 4. When the mobile device 1 receives the sign recognition information from the server 2, the display screen 12 displays the sign recognition information in the format of the preset language of mobile device 1. Thereby, the user can understand the sign language of the target person by reading the sign recognition information displayed on the display screen 12 of the mobile device 1.

In block S210, the menu generating module 101 generates and displays a submenu interface 120 on the display screen 12 when the text recognition icon 112 of the main menu interface 120 is selected. As mentioned above in FIG. 3, the submenu interface 120 includes a text input box 121, a language selection icon 122, a phone number input icon 123, a text analysis icon 124, and an interface return icon 125. In block S211, the user of the mobile device 1 inputs text data to be sent to the reception device 5 from the text input box 121, selects a reception language of the reception device 5 from the language selection icon 122, and inputs a phone number of the reception device 5 from the phone number input icon 123.

In block S212, the text processing module 103 packs the text data, the reception language, and the phone number to generate a text data packet when the text analysis icon 124 is selected. In block S213, the text processing module 103 transmits the text data packet to the server 2 through the network 4. In block S214, the text analysis unit 22 analyzes the text data packet to generate a text analysis result according to the text analysis standard stored in the data storage device 3 when the server 2 receives the text data packet from the mobile device 1. In block S215, the text analysis unit 22 converts the text analysis result into a sign recognition image according to the sign language standard stored in the data storage device 3. In block S216, the text analysis unit 22 sends the sign recognition image to the reception device 5 through the network 4 according to the reception phone number. When the reception device 5 receives the sign recognition image from the server 2, the user of the reception device 5 reviews the sign recognition image to understand the text data transmitted from the mobile device 1.

All of the processes described above may be embodied in, and fully automated via, functional code modules executed by one or more general purpose processors of communication devices. The functional code modules may be stored in any type of readable medium or other storage devices. Some or all of the methods may alternatively be embodied in specialized communication devices.

Although certain disclosed embodiments of the present disclosure have been specifically described, the present disclosure is not to be construed as being limited thereto. Various changes or modifications may be made to the present disclosure without departing from the scope and spirit of the present disclosure.

What is claimed is:

1. A sign language recognition system, the system being implemented by a mobile device connected to a server through a network, the mobile device comprising an image capturing unit and a display screen, the sign language recognition system comprising:
   a menu generating module configured to generate and display a main menu interface on the display screen, the main menu interface comprising an image recognition icon and a text recognition icon, and further generate and display a submenu interface on the display screen when the text recognition icon of the main menu interface is selected, the submenu interface comprising a language selection icon;
   an image processing module configured to control the image capturing unit to capture a gesture image of a target person when the image recognition icon is selected, extract sign language data from the gesture image according to body language of the target person, pack the sign language data and a preset language of the mobile device to generate a sign data packet, and transmit the sign data packet to the server for analyzing the sign language data to generate sign recognition information; and
   a text processing module configured to pack text data to be sent to a reception device, and a reception language and a phone number of the reception device to generate a text data packet when the text recognition icon is selected, and send the text data packet to the server for analyzing the text data to generate a sign recognition image recognizable by the reception device, wherein the reception language is selected from the language selection icon of the submenu interface according to a language used in the reception device.

2. The sign language recognition system according to claim 1, wherein the server connects to a data storage device that stores a sign language standard and a text analysis standard.

3. The sign language recognition system according to claim 2, wherein the server comprises: a sign language analysis unit configured to analyze the sign data packet to generate a sign analysis result according to the sign language standard when the server receives the sign data packet from the mobile device, convert the sign analysis result into the sign recognition information according to the preset language of the mobile device, and send the sign recognition information to the mobile device through the network.

4. The sign language recognition system according to claim 2, wherein the server comprises: a text analysis unit configured to analyze the text data packet to generate a text analysis result according to the text analysis standard when the server receives the text data packet from the mobile device, convert the text analysis result into the sign recognition image according to the sign language standard, and transmit the sign recognition image to the reception device according to the reception phone number.

5. The sign language recognition system according to claim 1, wherein the submenu interface further comprises a text input box, a phone number input icon, a text analysis icon, and an interface return icon.

6. The sign language recognition system according to claim 5, wherein text data is input from text input box, and the phone number of the reception device is input from the phone number input icon.

7. A sign language recognition method for a mobile device, the mobile device being connected to a server through a network and comprising an image capturing unit and a display screen, the method comprising:
   generating and displaying a main menu interface on the display screen, the main menu interface comprising an image recognition icon and a text recognition icon;
   determining whether the image recognition icon or the text recognition icon is selected;
   in response to the image recognition icon being selected, executing block (a1) to block (a5):
   (a1) controlling the image capturing unit to capture a gesture image of a target person;
   (a2) extracting sign language data from the gesture image according to body language of the target person;
   (a3) packing the sign language data and a preset language of the mobile device to generate a sign data packet;
   (a4) transmitting the sign data packet to the server for analyzing the sign language data to generate sign recognition information;
   (a5) receiving the sign recognition information from the server, and displaying the sign recognition information in format of the preset language on the display screen;

in response to the text recognition icon being selected, executing block (b1) to block (b4):

(b1) generating and displaying a submenu interface on the display screen, the submenu interface comprising a language selection icon;

(b2) packing text data to be sent to a reception device, and a reception language and a phone number of the reception device to generate a text data packet, wherein the reception language is selected from the language selection icon of the submenu interface according to a language used in the reception device;

(b3) transmitting the text data packet to the server for analyzing the text data to generate a sign recognition image recognizable by the reception device; and (b4) receiving the sign recognition image from the server, and displaying the sign recognition image on the reception device.

8. The method according to claim 7, wherein the server connects to a data storage device that stores a sign language standard and a text analysis standard.

9. The method according to claim 8, wherein the block (a4) comprises:

analyzing the sign data packet to generate a sign analysis result according to the sign language standard when the server receives the sign data packet from the mobile device;

converting the sign analysis result into the sign recognition information according to the preset language of the mobile device; and sending the sign recognition information to the mobile device through the network.

10. The method according to claim 8, wherein the block (b3) comprises:

analyzing the text data packet to generate a text analysis result according to the text analysis standard when the server receives the text data packet from the mobile device;

converting the text analysis result into the sign recognition image according to the sign language standard; and transmitting the sign recognition image to the reception device according to the reception phone number.

11. The method according to claim 7, wherein the submenu interface further comprises a text input box for inputting the text data to be sent to the reception device, and a phone number input icon for inputting the phone number of the reception device.

12. A non-transitory storage medium having stored thereon instructions that, when executed by a processor of a mobile device, cause the mobile device to perform a method for recognizing sign language, the method comprising:

generating and displaying a main menu interface on the display screen, the main menu interface comprising an image recognition icon and a text recognition icon;

determining whether the image recognition icon or the text recognition icon is selected;

in response to the image recognition icon being selected, executing block (a1) to block (a5):

(a1) controlling the image capturing unit to capture a gesture image of a target person;

(a2) extracting sign language data from the gesture image according to body language of the target person;

(a3) packing the sign language data and a preset language of the mobile device to generate a sign data packet;

(a4) transmitting the sign data packet to a server for analyzing the sign language data to generate sign recognition information; and (a5) receiving the sign recognition information from the server, and displaying the sign recognition information in format of the preset language on the display screen;

in response to the text recognition icon being selected, executing block (b1) to block (b4):

(b1) generating and displaying a submenu interface on the display screen, the submenu interface comprising a language selection icon;

(b2) packing text data to be sent to a reception device, and a reception language and a phone number of the reception device to generate a text data packet, wherein the reception language is selected from the language selection icon of the submenu interface according to a language used in the reception device;

(b3) transmitting the text data packet to the server for analyzing the text data to generate a sign recognition image recognizable by the reception device; and (b4) receiving the sign recognition image from the server, and displaying the sign recognition image on the reception device.

13. The non-transitory storage medium according to claim 12, wherein the server connects to a data storage device that stores a sign language standard and a text analysis standard.

14. The non-transitory storage medium according to claim 13, wherein the block (a4) comprises:

analyzing the sign data packet to generate a sign analysis result according to the sign language standard when the server receives the sign data packet from the mobile device;

converting the sign analysis result into the sign recognition information according to the preset language of the mobile device; and sending the sign recognition information to the mobile device through the network.

15. The non-transitory storage medium according to claim 13, wherein the block (b3) comprises:

analyzing the text data packet to generate a text analysis result according to the text analysis standard when the server receives the text data packet from the mobile device;

converting the text analysis result into the sign recognition image according to the sign language standard; and transmitting the sign recognition image to the reception device according to the reception phone number.

16. The non-transitory storage medium according to claim 12, wherein the submenu interface comprises a text input box for inputting the text data to be sent to the reception device, and a phone number input icon for inputting the phone number of the reception device.

* * * * *